US012366877B2

(12) United States Patent
Gangula et al.

(10) Patent No.: US 12,366,877 B2
(45) Date of Patent: Jul. 22, 2025

(54) GAIN AND TEMPERATURE TOLERANT BANDGAP VOLTAGE REFERENCE

(71) Applicant: TEXAS INSTRUMENTS INCORPORATED, Dallas, TX (US)

(72) Inventors: Sudheer Gangula, Tucson, AZ (US); Jerry Doorenbos, Tucson, AZ (US); Dimitar Trifonov, Vail, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 155 days.

(21) Appl. No.: 17/950,276

(22) Filed: Sep. 22, 2022

(65) Prior Publication Data

US 2024/0103558 A1 Mar. 28, 2024

(51) Int. Cl.
*G05F 3/30* (2006.01)
*G05F 3/24* (2006.01)
*G05F 1/567* (2006.01)

(52) U.S. Cl.
CPC ................ *G05F 3/30* (2013.01); *G05F 3/245* (2013.01); *G05F 1/567* (2013.01)

(58) Field of Classification Search
CPC ........................................................ G05F 1/567
See application file for complete search history.

(56) References Cited

U.S. PATENT DOCUMENTS 6,384,586 B1 * 5/2002 Sugawara ............... G05F 3/225 323/316
7,560,979 B1 * 7/2009 Hsu ........................... G05F 3/30 327/539
2019/0025868 A1 * 1/2019 Segarra ..................... G05F 3/30

* cited by examiner

*Primary Examiner* — Peter M Novak
(74) *Attorney, Agent, or Firm* — John R. Pessetto; Frank D. Cimino

(57) ABSTRACT

Examples of bandgap circuits and elements thereof enable generation of an accurate and stable bandgap reference voltage that is not affected by low current gain. An example circuit includes first and second input transistors, each having an emitter to receive a tail current; first and second core transistors, a collector of each coupled to ground; a first lower leg coupled between a first upper leg and the emitter of the first core transistor at a first current input coupled to the base of the first input transistor; a second lower leg coupled between a second upper leg and the emitter of the second core transistor at a second current input coupled to the base of the second input transistor; and a base resistor coupled between the base and collector of the first core transistor. The input transistor pair has a current density ratio that is the same as that of the core transistor pair.

16 Claims, 3 Drawing Sheets

2/3

GAIN AND TEMPERATURE TOLERANT BANDGAP VOLTAGE REFERENCE

FIELD OF DISCLOSURE

This disclosure relates generally to generating an accurate bandgap voltage reference across a wide temperature range, even at low current gain (low beta), and more particularly to circuits, systems and methods to generate such a bandgap voltage reference using low beta transistors.

BACKGROUND

A bandgap voltage reference circuit (or simply bandgap circuit) is used to generate an accurate bandgap reference voltage that is stable across various process, voltage, temperature (PVT) conditions for use by other circuits that require such a voltage, e.g., analog-to-digital converters (ADCs), digital-to-analog converters (DACs), and precise comparators, such as those used in data converter and phase-locked loop systems. Bandgap circuits are widely used in integrated circuits. In general, a bandgap circuit provides an accurate and relatively stable reference voltage by compensating for the negative temperature coefficient voltage of a forward biased base-emitter junction with a positive temperature coefficient voltage.

A conventional bandgap circuit uses diode-configured first and second vertical p-type bipolar junction transistors, in which each transistor has its base and collector coupled together (PNP1 and PNP2). The base and collector of each of PNP1 and PNP2 is also coupled to ground.

PNP1 and PNP2, respectively disposed in first and second legs of the circuit, have emitter areas sized to operate at different current densities, in which the current density ratio is N. The source of a p-type metal-oxide-silicon field-effect transistor (p-type MOSFET or PMOS transistor) is coupled to a voltage supply terminal and the drain of the PMOS transistor is coupled to the first and second legs at an output node of the circuit, where the bandgap reference voltage is output. Each of the first and second legs has a resistor of resistance R2 coupled to the output node. The second leg has a second resistor of resistance value R1 coupled between the R2-valued resistor and the emitter of PNP2.

This bandgap circuit also includes an operational transconductance amplifier (OTA) having inverting and non-inverting inputs coupled to the first and second legs, respectively. The inverting input is coupled to the first leg between the resistor and the emitter of PNP1, and the non-inverting input is coupled to second leg between the two resistors in that leg. The output of the error amplifier controls the gate of the PMOS transistor. With sufficiently high current gain, the base currents at the bases of the PNPs can be ignored. Thus, for each of the PNPs, the emitter current is approximately equal to the collector current, so the feedback from the OTA results in approximately equal current being delivered to each of the first and second legs.

The PMOS transistor forces equal current down each leg toward the emitter of each of PNP1 and PNP2. At a sufficiently high current gain, base currents can be ignored. The difference in current densities between the PNPs results in a difference forward voltage ($\Delta V_{BE}$), which is used to generate a current that is proportional to absolute temperature (PTAT) in the R1-valued resistor in the second leg. The PTAT current of $\Delta V_{BE}/R1 \cong V_T \ln(N)$, where $V_T$ is the thermal voltage of PNP2. The bandgap reference voltage is given by the sum of $V_{BE}$ (of PNP2) which is the complementary to absolute temperature (CTAT) term, and the PTAT term ($\Delta V_{BE}$*(1+−R2/R1)). By scaling resistance values R2 and R1, an output voltage close to bandgap can be generated that exhibits very little variation over PVT conditions.

However, a problem arises when the current gain of the two PNPs is not high enough to ignore the base currents created. The current gain can drop to as low as 0.5 at a weak cold corner. Even under more favorable conditions, the gain may remain below 10, which is generally the upper end of the range in which the base currents become significant with respect to the emitter currents, which are approximately 5-10 μA. While the OTA still operates to force approximately equal current in both legs, the voltage drop across the R1-valued resistor is not purely PTAT. A base current error is introduced, and the above-described conventional bandgap circuit is not configured to compensate for such error.

A solution to this issue is thus desirable. In this context, embodiments of the invention arise.

SUMMARY

In an example, a circuit comprises input circuitry and main circuitry. The input circuitry has a tail current transistor (e.g., M9), and first and second input transistors (e.g., M3 and M4), each having a current terminal coupled to the tail current transistor, wherein a current density ratio of the second input transistor to the first input transistor is N. The main circuitry includes a first core transistor (e.g., M1) having a first current terminal, a second current terminal, and a control terminal, the second current terminal coupled to a reference node (e.g., ground); and a second core transistor (e.g., M2) having a first current terminal, a second current terminal, and a control terminal, the second current terminal coupled to the reference node, wherein the current density ratio of the second core transistor to the first core transistor is N. The main circuitry also includes first upper and lower legs, the first lower leg coupled between the first upper leg and the first current terminal of the first core transistor, the coupling between the first upper and lower legs defining a first current input coupled to a control terminal of the first input transistor; and second upper and lower legs, the second lower leg coupled between the second upper leg and the first current terminal of the second core transistor, the coupling between the second upper and lower legs defining a second current input coupled to a control terminal of the second input transistor. A base resistive element of the main circuitry is coupled between the control terminal of the first core transistor and the second current terminal of the first core transistor.

In an example, a bandgap circuit comprises replica circuitry and an amplifier, a core and an output section. The replica circuitry is configured to generate a bias current under control of the amplifier. The core includes input circuitry and main circuitry. The core is configured to output an intermediate output voltage in response to voltage inputs and the bias current. The output section includes error-correction circuitry configured to remove an error component of the intermediate output voltage and output a bandgap reference voltage that is the difference between the intermediate output voltage and the error component.

In an example, a method comprises generating a bias current; mirroring the bias current to a core portion of a bandgap circuit to generate a tail current for first and second input transistors of the core; generating, in response to inputs applied to the core, first and second currents in first and second upper legs, respectively, of main circuitry of the core, in which the first and second currents are approximately equal; and generating, in response to the tail current, first and second base currents at the bases of the first and second input transistors, respectively, for the main circuitry, in which the first and second base currents are approximately equal.

These and other features will be better understood from the following detailed description with reference to the accompanying drawings.

BRIEF DESCRIPTION OF THE DRAWINGS

Features of the disclosure may be understood from the following figures taken in conjunction with the detailed description.

DETAILED DESCRIPTION

Figure 1:
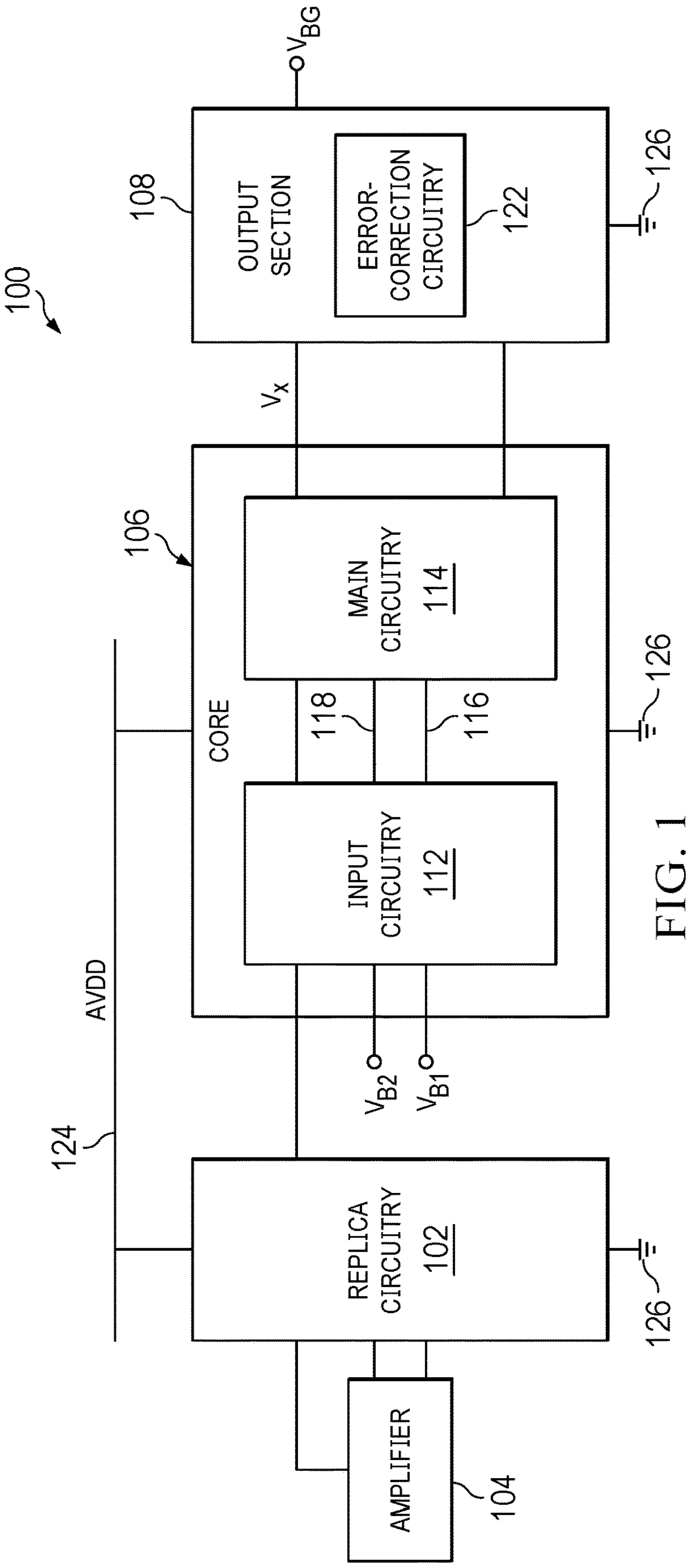
FIG. 1 is a block diagram of an example bandgap voltage reference circuit.

Specific examples are described below in detail with reference to the accompanying figures. These examples are not intended to be limiting. In the drawings, corresponding numerals and symbols generally refer to corresponding parts unless otherwise indicated. The objects depicted in the drawings are not necessarily drawn to scale.

In example arrangements, circuits and elements thereof are provided that enable generation of an accurate and stable bandgap reference voltage, i.e., a bandgap reference voltage that exhibits very small variation across a wide temperature range and that is not affected by low current gain (low beta). An example bandgap voltage reference circuit (bandgap circuit) improves the accuracy of the bandgap reference voltage by correcting for error caused by low beta (i.e., non-trivial base current with respect to collector current) over a range of low current gain values.

In an example, a bandgap circuit is formed of a core that generates a tail current for skewed first and second PNP input transistors having a current density ratio of N, where N is an integer greater than 1. Approximately equal base currents are generated at the bases of the first and second input transistors, in which each base current is approximately equal to a base current generated in replica circuitry coupled to the core. The base currents generated in the core are added to currents flowing through resistors (each of resistance value $R_2$) in respective upper legs of main circuitry to form emitter currents for first and second vertical core PNP transistors of the main circuitry, which also have a current density ratio of N. A resistor (of resistance value $R_1$) is disposed in a lower leg coupled between its corresponding upper leg and the emitter of the second core transistor, and another resistor (of resistance value $R_1/2$) is disposed in series with the $R_2$-valued resistor in the upper leg for the first core transistor. A base resistor of resistance value $R_1$ is coupled between the base and collector of the first core transistor. As in the replica circuitry, which is a replica of the main circuitry, a base current flows through the base resistor of the main circuitry. The input transistors and core transistors are sized such that the $\Delta V_{BE}$ is the same for both pairs.

Using feedback, this configuration equalizes the voltage drops on both legs and thus creates the same current (PTAT current) through each leg. The configuration, thus, makes it easier, through the scaling of resistive values, to cancel or remove an error-induced voltage component of an intermediate output voltage generated by the core.

To remove the error-induced voltage, the core is coupled to an output section that includes error-correction circuitry to remove or substantially reduce the error caused by the base currents. The bandgap circuit can be combined with trim at one or more temperatures to achieve even greater accuracy.

FIG. 1 is a block diagram of an example bandgap voltage reference circuit (bandgap circuit) 100. Bandgap circuit 100 may include replica circuitry 102 with an associated amplifier (e.g., an OTA) 104, a core 106, and an output section 108. Replica circuitry 102 is configured to generate a bias current. Core 106 includes input circuitry 112 that includes a folded cascode amplifier with voltage inputs configured to receive bias voltages $V_{B1}$ and $V_{B2}$, respectively. Input circuitry 112 is coupled to replica circuitry 102 to mirror the bias current at 2×, and the mirrored current is used as a tail current to drive a pair of input PNP transistors to generate respective base currents on base current paths 116 and 118, respectively, which base currents are approximately the same. Main circuitry 114 of core 106, which is configured substantially the same as replica circuitry 102, is coupled to input circuitry 112 to generate collector currents flowing in respective upper legs of main circuitry 114. The base and collector currents are combined in respective lower legs of main circuitry 114 to form emitter currents of respective PNP core transistors.

Replica circuitry 102 and core circuitry 106 are each coupled to a voltage supply terminal 124, which is adapted to be coupled to a supply voltage (AVDD). Replica and core circuitry 102, 106, as well as output section 108, are each coupled to a reference node 126, e.g., a ground terminal.

The feedback coupling between input circuitry 112 and main circuitry 114 creates approximately equal collector currents, which are PTAT currents. An intermediate output voltage ($V_x$) is generated that includes the CTAT voltage term, the PTAT voltage term, and an error term that is a factor of the base current. The error term is then removed by error-correction circuitry 122 of output section 108 to generate the substantially flat bandgap reference voltage ($V_{BG}$), which is stable across a wide temperature range and is not affected by low current gain.

Figure 2:
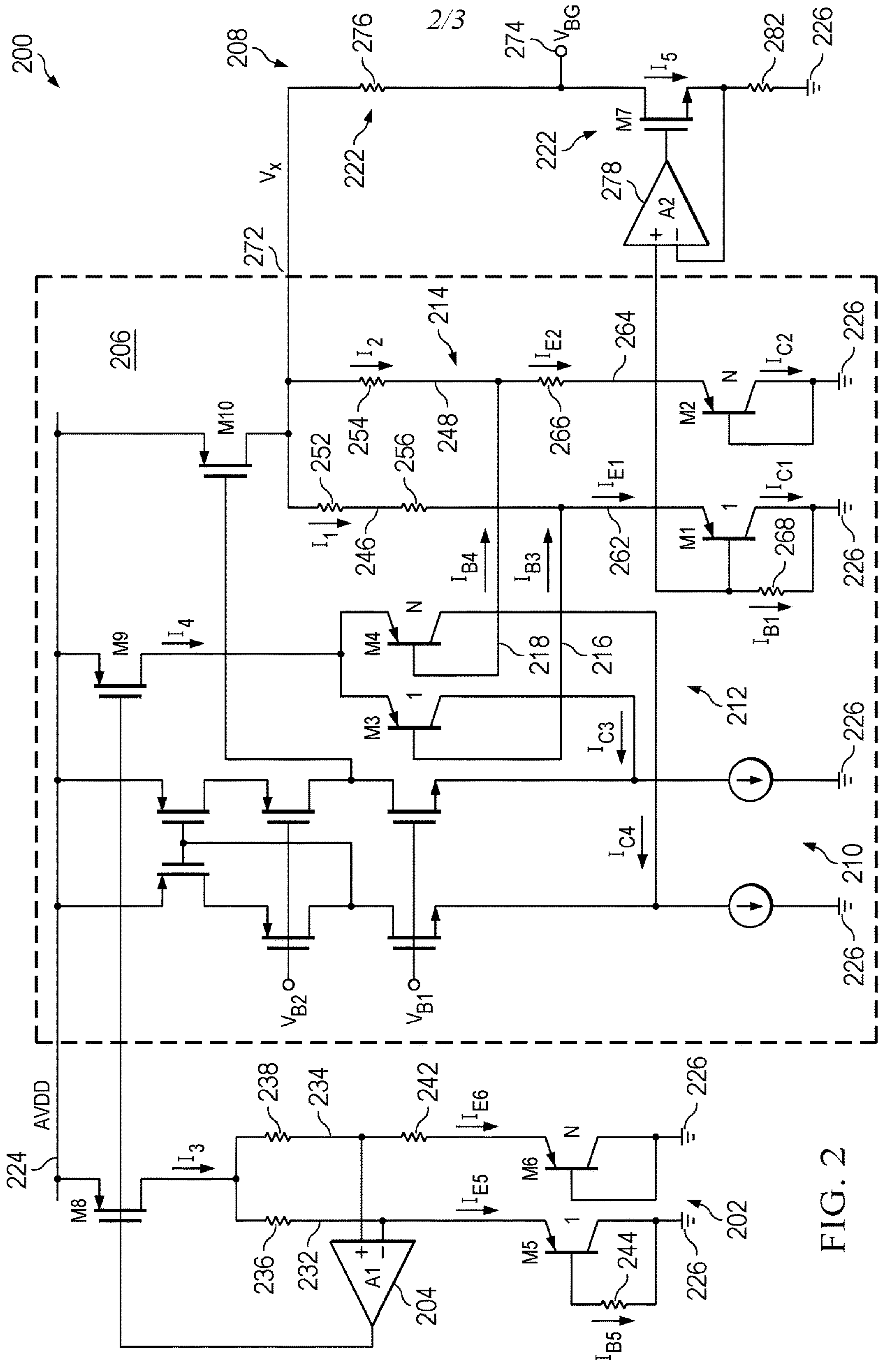
FIG. 2 is a circuit diagram of an example bandgap voltage reference circuit, such as that shown in FIG. 1.

FIG. 2 is a circuit diagram of an example bandgap circuit 200, which generally comprises various circuit components that respectively correspond or substantially correspond to the blocks shown in FIG. 1. To that end, bandgap circuit 200 includes replica circuitry 202, an associated amplifier (e.g., an OTA or error amplifier) 204, a core 206, and an output section 208. Core 206 includes input circuitry 212 and main circuitry 214 coupled via base current paths 216 and 218. Output section 208 includes error-correction circuitry 222.

Replica circuitry 202 includes a PMOS transistor M8 having a source coupled to a supply voltage terminal 224 configured to be coupled to a supply voltage (e.g., AVDD). The drain of transistor M8 is coupled to a pair of current paths 232 and 234. Equal-sized resistors 236 and 238 (each having a resistance value of $R_2$) are disposed in paths 232 and 234, respectively. The gate of transistor M8 is coupled to the output of amplifier 204, which controls the flow of a generated bias current ($I_3$). Another resistor 242 is disposed in current path 234. Resistor 242 has a resistance value of $R_1$, which is less than $R_2$. Resistor 242 is coupled between resistor 238 and the emitter of a PNP transistor M6. The base and collector of transistor M6 are coupled together at a reference node or a ground terminal 226. In current path 232, resistor 236 is coupled between the drain of transistor M8 and the emitter of a PNP transistor M5. A base resistor 244 (of resistance value $R_1$) is coupled between the base of transistor M5 and its collector, which is also coupled to ground terminal 226. Transistors M5 and M6 are vertically configured and have a current density ratio of N, where N is an integer greater than 1.

In operation, bias current $I_3 \cong I_C + I_B$, which is divided approximately equally into current paths 232 and 234. Thus, the emitter current of transistor M5 ($I_{E5}$) is approximately $I_C/2 + I_B/2$, and the emitter current of transistor M6 ($I_{E6}$) is approximately the same. The base current of transistor M5 ($I_{B5}$) is approximately $I_B/2$.

One of the inputs of amplifier 204 (e.g., the inverting input) is coupled to the emitter of transistor M5, and the other input of error amplifier 204 (e.g., the non-inverting input) is coupled to current path 234 between resistors 238 and 242. Amplifier 204 is preferably of CMOS design having very high input impedance, such that only a minuscule amount of current appears at the inputs. Amplifier 204 controls the gate of transistor M8 based on a comparison of the voltages measured at the input connection points.

Core 206 includes a PMOS transistor M9, the source of which is coupled to supply voltage terminal 224. The gate of transistor M9 is coupled to the gate of PMOS transistor M8 of replica circuitry 202 to mirror bias current $I_3$ on M9 at 2×. The mirrored current ($I_4$), which is thus approximately $2(I_C + I_B)$, is used as a tail current for a pair of skewed input PNP transistors M3 and M4 of input circuitry 212. The emitter of each of transistors M3 and M4 is coupled to the drain of M9. Transistors M3 and M4 are configured such that their current density ratio is N. Base currents $I_{B3}$ and $I_{B4}$ are generated from the bases of transistors M3 and M4, respectively. Base currents $I_{B3}$ and $I_{B4}$ flow on current paths 216 and 218, respectively, to main circuitry 214.

The collectors of transistors M3 and M4 are coupled to respective branches of a folded cascode amplifier generally identified by reference numeral 210, such that collector currents $I_{C3}$ and $I_{C4}$ of transistors M3 and M4 flow to the respective branches. Folded cascode amplifier 210 may be substantially the same as amplifier 204 with two bias voltage inputs at which bias voltages $V_{B1}$ and $V_{B2}$ are respectively applied to control a PMOS transistor M10 of main circuitry 214 to generate approximately equal currents $I_1$ and $I_2$ in first and second upper legs 246 and 248, respectively, of main circuitry 214. An example configuration of a folded cascode amplifier is shown in FIG. 2. However, as those skilled in the art will understand, alternate configurations may be employed consistent with the teachings herein.

Main circuitry 214 also includes first and second upper legs 246 and 248 in which resistors 252 and 254 are respectively disposed. Each of resistors 252 and 254 has a resistance value of $R_2$. A second resistor 256 is also disposed in first upper leg 246. Resistor 256 has a resistance value of $R_1/2$, where $R_1$ is less than $R_2$.

First and second upper legs 246 and 248 are respectively coupled to first and second lower legs 262 and 264. Base current path 216 feeds into first lower leg 262 where it is coupled to first upper leg 246. The other end of first lower leg 262 is coupled to the emitter of core PNP transistor M1. Base current path 218 feeds into second lower leg 264 where it is coupled to second upper leg 248. A resistor 266 is disposed in second lower leg 264 between its coupling to second upper leg 248 and the emitter of core PNP transistor M2. Resistor 266 has a resistance value of $R_1$. The collector and base of transistor M2 are coupled together and also to ground terminal 226. A base resistor 268 of resistance value $R_1$ is coupled between the base and collector of transistor M1. The collector of transistor M1 is coupled to ground terminal 226. Core PNP transistors M1 and M2 are vertically configured and have a current density ratio of N.

Thus, main circuitry 214 is substantially the same as replica circuitry 202. More precisely, replica circuitry 202 is constructed to be a replica of main circuitry 214. Feedback is provided to main circuitry 214 is provided through skewed input PNP transistors M3 and M4 having the same current density ratio of N that core PNP transistors M1 and M2 have and folded cascode amplifier 210, which is coupled to both input circuitry 212 and main circuitry 214.

The coupling of the drain of transistor M10 to first and second upper legs 246 and 248 forms an intermediate output node 272 coupling core 206 to output section 208. An intermediate output voltage $V_x$ is generated at intermediate output node 272. Output section 208 includes an output terminal 274 where the bandgap reference voltage ($V_{BG}$) is generated. To remove the error component of $V_x$, error-correction circuitry 222 of output section 208 includes an amplifier (e.g., an error amplifier or OTA) 278, NMOS transistor M7, and resistors 276 and 282. Resistor 276 is coupled between intermediate output node 272 and output terminal 274. The drain of transistor M7 is coupled to output terminal 274, and resistor 282 is coupled between the source of M7 and the inverting input (−) of amplifier 278. The non-inverting input (+) is coupled to the base of transistor M1, and the output of error amplifier is coupled to the gate of transistor M7.

Core 206 is configured such that, in operation, currents $I_1$ and $I_2$ flowing through first and second upper legs 246 and 248, respectively, are approximately equal; thus, $I_1 \cong I_2 \cong I_C$, the latter of which represents the collector current. Since the base currents flowing from the bases of transistors M3 and M4 ($I_{B3}$ and $I_{B4}$, respectively) are equal ($I_{B3} \cong I_{B4} \cong I_B$), emitter currents $I_{E1}$ and $I_{E2}$ flowing to the emitters of PNP core transistors M1 and M2, respectively, are also approximately equal. That is, $I_{E1} \cong I_{E2} \cong I_C + I_B$. Moreover, the base current flowing through resistor 268, denoted $I_{B1}$, is approximately equal to $I_B$.

$I_C$ is the PTAT current, which flows through each of first and second upper legs 246 and 248.

$$I_C = \left(2 * \frac{\Delta V_{BE}}{R_1}\right),$$

where $\Delta V_{BE}$ is the difference in base-emitter voltages of transistors M1 and M2.

The intermediate output voltage $V_x$ may be expressed as:

$$V_x \cong I_B * R_1 + V_{BE} + \left(\frac{R_1}{2}\right) * I_C + R_2 * I_C.$$

Substituting for $I_C$ yields:

$$V_x \cong I_B * R_1 + V_{BE} + \left(\frac{R_1}{2}\right) * \left(2 * \frac{\Delta V_{BE}}{R_1}\right) + R_2 * \left(2 * \frac{\Delta V_{BE}}{R_1}\right).$$

Rearranging yields:

$$V_x \cong I_B * R_1 + V_{BE} + \Delta V_{BE} + \left(2 * \frac{R_2}{R_1}\right) * \Delta V_{BE}.$$

The bandgap voltage $V_{BG}$ is approximately $V_x-(I_B*R_1)$, where $(I_B*R_1)$ represents the base current error voltage term. This error voltage term is canceled by error-correction circuitry 222. Amplifier 278, which has its non-inverting input coupled to the base of transistor M1, senses the voltage drop on resistor 268.

This sensed voltage across resistor 268 represents the error voltage term $(I_B*R_1)$, which is forced on resistor 282 with feedback created by driving transistor M7. This pulls a current of $I_5$ ($\cong I_B$) in this branch of output section 208, creating the same voltage drop of $I_B*R_1$ on resistor 276. Thus, $V_{BG}$ is the sum of the CTAT and PTAT voltage components and can be expressed as:

$$V_{BG} = V_{BE} + \Delta V_{BE}\left(1 + 2\left(\frac{R_2}{R_1}\right)\right).$$

Substituting for $\Delta V_{BE}$, yields:

$$V_{BG} = V_{BE} + V_T(\ln N)\left(1 + 2\left(\frac{R_2}{R_1}\right)\right).$$

As thus configured, bandgap circuit 200 provides an accurate bandgap reference voltage at low current gain. Bandgap circuit 200 not only removes or greatly reduces the error created due to low current gain, it also provides a more accurate bandgap reference voltage over a wide range of temperatures. With bandgap circuit 200, variation of the bandgap reference voltage over corners may be less than half the variation experienced over the same corners using a conventional bandgap circuit.

Figure 3:
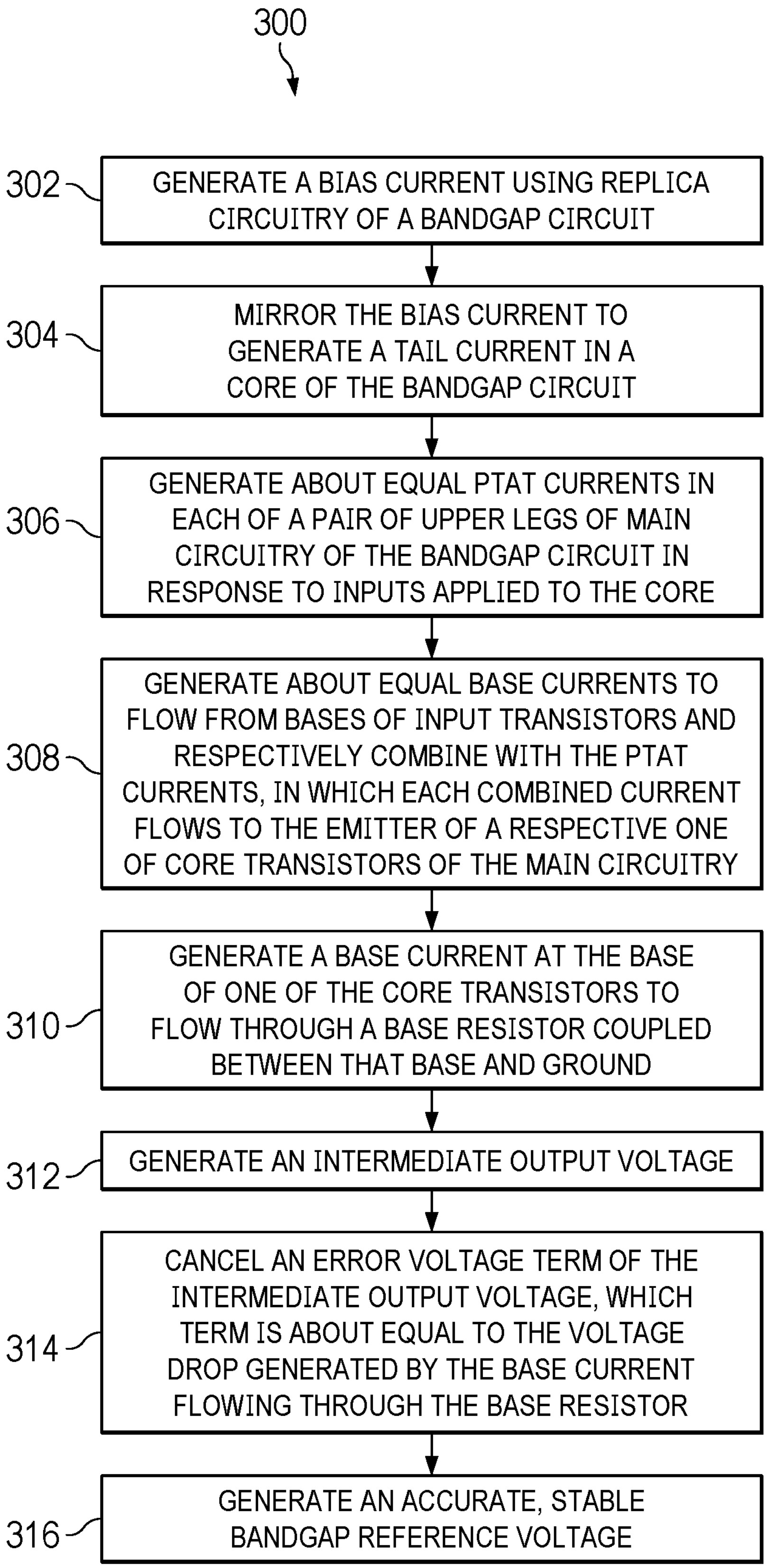
FIG. 3 is a flow diagram of an example method of generating a bandgap reference voltage.

FIG. 3 is a flow diagram an example method 300 of generating a bandgap reference voltage, using, for example, bandgap circuit 200. In operation 302, a bias current is generated using, e.g., replica circuitry 202, in which core PNP transistors have a current density ratio of N, and an associated amplifier 204. In operation 304, the bias current is then mirrored at 2× to generate a tail current in a core 206 of bandgap circuit 200. The tail current divides into two branches of input circuitry 212, in which the current in each branch flows to the emitter of a respective one of a pair of PNP input transistors. In operation 306, approximately equal PTAT currents are generated in each of a pair of upper legs of main circuitry 214 in response to inputs applied to core 206. In operation 308, approximately equal base currents are generated and flow from the bases of the input transistors and respectively combine with the PTAT currents, after which each combined current flows to the emitter of a respective one of a pair of PNP core transistors of main circuitry 214. In operation 310, a base current is generated at the base of one of the core transistors and flows through a base resistor coupled between that base and ground. In operation 312, an intermediate output voltage is generated. In operation 314, an error voltage term of the intermediate output voltage, which term is approximately equal to the voltage drop generated by the base current flowing through the base resistor, is canceled or removed from the intermediate output voltage, using error-correction circuitry 222 of an output section 208 of bandgap circuit 200. In operation 316, an accurate, gain- and temperature-tolerant bandgap reference voltage is generated.

FIG. 3 depicts one possible order of operations to generate a bandgap reference voltage. Not all operations need necessarily be performed in the order described. Two or more operations may be combined into a single operation. Some operations may be performed substantially simultaneously. Additional operations and/or alternative operations may be performed consistent with the description herein.

Various examples of bandgap circuits and circuitry thereof enable generation of an accurate and stable bandgap reference voltage that is both temperature tolerant and current gain tolerant. In particular, such circuits are not affected by low current gain (low beta). At a single temperature trim of approximately 27° C., the bandgap reference voltage generated according to the teachings herein may exhibit approximately 2.4 mV variation over a temperature range of approximately −55° C. to approximately 155° C., which is significantly less than conventional bandgap circuits. Circuits, such as that depicted in FIG. 2, may be employed in applications or processes that require an accurate bandgap reference voltage but do not support high current gain BJTs.

The term "couple" is used throughout the specification. The term and derivatives thereof may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (i.e., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the term "terminal" means "node", "interconnection", "pin" and/or "lead". Unless specifically stated to the contrary, these terms generally mean an interconnection between or a terminus of a device element, a circuit element, an integrated circuit, a device or other electronic or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors), and/or one or more sources (such as voltage and/or current sources) may instead include only the semiconductor elements within a single physical device (i.e., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Components shown as resistors, unless otherwise stated, are generally representative of one or more elements coupled in series and/or parallel to provide an amount of impedance represented by the shown resistor. For example, a resistor described herein as a single resistor may instead be multiple resistors coupled in parallel between the same nodes. Similarly, multiple resistors in series may be combined into a single resistor.

In the examples described herein, the term "control terminal(s)" with respect to BJT transistor(s) refers to the base(s) of such transistor(s), and "control terminal(s)" used in connection with MOSFET transistor(s) refers to the gate(s) of such transistor(s). The term "current terminal" refers to drain and source terminals of a MOSFET transistor, and to emitter and collector terminals of a BJT. Uses of the phrase "ground" herein includes a chassis ground, an Earth ground, a floating ground, a virtual ground, a digital ground, a common ground, and/or any other form of ground connection applicable to, or suitable for, the teachings of this description. Unless otherwise stated, "about," "approximately," "about" or "substantially" preceding a value means+/−10 percent of the stated value.

Modifications of the described examples are possible, as are other examples, within the scope of the claims. Moreover, features described herein may be applied in other environments and applications consistent with the teachings provided.

What is claimed is:

1. A circuit comprising:
input circuitry including
a tail current transistor, and
first and second input transistors, each having a current terminal coupled to the tail current transistor, wherein a current density ratio of the second input transistor to the first input transistor is N; and
main circuitry including
a first core transistor having a first current terminal, a second current terminal, and a control terminal, the second current terminal coupled to a reference node,
a second core transistor having a first current terminal, a second current terminal, and a control terminal, the second current terminal coupled to the reference node, wherein the current density ratio of the second core transistor to the first core transistor is N,
a first upper leg and a first lower leg, the first lower leg coupled between the first upper leg and the first current terminal of the first core transistor, the coupling between the first upper and lower legs defining a first current input coupled to a control terminal of the first input transistor,
a second upper leg and a second lower leg, the second lower leg coupled between the second upper leg and the first current terminal of the second core transistor, the coupling between the second upper and lower legs defining a second current input coupled to a control terminal of the second input transistor, and
a base resistive element coupled between the control terminal of the first core transistor and the second current terminal of the first core transistor,
wherein N is an integer greater than 1.

2. The circuit of claim 1, further comprising:
an output section coupled to the first and second upper legs of the main circuitry and to the control terminal of the first core transistor, the output section including error-correction circuitry and an output terminal.

3. The circuit of claim 2, wherein the error-correction circuitry includes:
a first output resistive element having a first end coupled to the first and second upper legs of the main circuitry;
an output transistor having a first current terminal, a second current terminal, and a control terminal, the first current terminal coupled to a second end of the first output resistive element to define the output terminal;
an amplifier having a first input, a second input, and an output, the first input coupled to the control terminal of the first core transistor, the second input coupled to the second current terminal of the output transistor, and the output coupled to the control terminal of the output transistor; and
a second output resistive element having a first end coupled to the second current terminal of the output transistor and to the second input of the amplifier, the second output resistive element having a second end coupled to the reference node.

4. The circuit of claim 3, wherein the first and second output resistive elements have approximately the same resistance value.

5. The circuit of claim 1, wherein the main circuitry further includes:
a first resistive element in the first upper leg, the first resistive element having a first resistance value;
a second resistive element in the second upper leg, the second resistive element having a second resistance value that is less than the first resistance value; and
a third resistive element in the second lower leg, the third resistive element having a third resistance value that is less than the second resistance value.

6. The circuit of claim 1, further comprising replica circuitry and an amplifier,
the replica circuitry including:
a bias current transistor having a control terminal coupled to a control terminal of the tail current transistor; and
first and second current branches;
the amplifier having first and second inputs respectively coupled to the first and second current branches, and an output coupled to the control terminal of the bias current transistor.

7. The circuit of claim 6, wherein the replica circuitry includes first and second replica transistors respectively coupled to the first and second branches, wherein the current density ratio of the second replica transistor to the first replica transistor is N.

8. The circuit of claim 7, wherein:
the replica circuitry and amplifier are configured to generate a bias current;
the tail current transistor is configured to generate a tail current in an amount that is a multiple of an amount of the bias current, the multiple being an integer of 2 or more; and
the circuit is configured to generate:
an upper leg current in each of the first and second upper legs, in response to bias voltages applied to the circuit,
a base current at the control terminal of each of the first input transistor and the second input transistor,
an error current through the base resistive element to generate a voltage drop, the error current being approximately equal to the base current, and
an intermediate output voltage having a voltage component that is a function of a value of the base current and a resistance value of the base resistive element.

9. The circuit of claim 8, further comprising:
an output section coupled to the first and second upper legs of the main circuitry and to the control terminal of the first core transistor, the output section including error-correction circuitry and an output terminal, the error-correction circuitry configured to:
remove an error component of the intermediate output voltage, the error component being approximately equal to the voltage drop.

10. The circuit of claim 1, wherein:

each of the first and second input transistors is PNP transistor, in which the current terminal of each that is coupled to the tail current transistor is an emitter terminal; and each of the first and second core transistors is a vertically-configured PNP transistor, wherein the first current terminal of each of the first and second core transistors is an emitter terminal and the second current terminal of each of the first and second core transistors is a collector terminal.

11. The circuit of claim 1, further comprising:

a folded cascode amplifier having voltage inputs and a voltage output, the folded cascode amplifier coupled to the first and second input transistors.

wherein the main circuitry further comprises a control transistor having a control terminal coupled to the voltage output of the folded cascode amplifier.

12. A bandgap circuit comprising:

replica circuitry and an amplifier, the replica circuitry configured to generate a bias current under control of the amplifier;

a core including input circuitry and main circuitry, the core configured to output an intermediate output voltage in response to voltage inputs and the bias current; and an output section including error-correction circuitry configured to remove an error component of the intermediate output voltage and output a bandgap reference voltage that is the difference between the intermediate output voltage and the error component;

wherein the main circuitry is configured to:

generate a first current in a first upper leg of the main circuitry;

generate a second current in a second upper leg of the main circuitry;

wherein the replica circuitry is a replica of the main circuitry, each of the replica circuitry and the main circuitry including first and second core transistors having a current density ratio of N, wherein N is an integer greater than 1;

wherein the input circuitry includes first and second input transistors having a current density ratio of N; and wherein the input circuitry is configured to generate first and second base currents from control terminals of the first and second input transistors, respectively.

13. The bandgap circuit of claim 12, wherein the core is configured to:

combine the first base current with the first current at an emitter current path coupled to an emitter of the first core transistor of the main circuitry; and combine the second base current with the second current at an emitter current path coupled an emitter of the second core transistor of the main circuitry.

14. The bandgap circuit of claim 13, wherein the main circuitry is configured to generate an error current through a base resistor coupled between a control terminal of the first core transistor of the main circuitry and a reference node.

15. The bandgap circuit of claim 14, wherein the error-correction circuitry includes an amplifier configured to sense a voltage drop across the base resistor.

16. A method comprising:

generating a bias current;

mirroring the bias current to a core portion of a bandgap circuit to generate a tail current for first and second input transistors of the core;

generating, in response to inputs applied to the core, first and second currents in first and second upper legs, respectively, of main circuitry of the core, in which the first and second currents are approximately equal;

generating, in response to the tail current, first and second base currents at the bases of the first and second input transistors, respectively, for the main circuitry, in which the first and second base currents are approximately equal;

generating a first emitter current for an emitter of a first core transistor of the core, the first emitter current being the sum of the first current and the first base current;

generating a second emitter current for an emitter of a second core transistor of the core, the second emitter current being the sum of the second current and the second base current;

generating an error current in a resistor coupled between a control terminal of the first core transistor and a reference node;

generating an intermediate output voltage at an output of the core;

removing an error component of the intermediate output voltage using error-correction circuitry of an output section of the bandgap circuit;

wherein the removing of the error component of the intermediate output voltage comprises:

sensing a voltage drop across the base resistor using an amplifier of the error-correction circuitry, the voltage drop representative of the error component;

applying the error current to a first output resistor by driving an output transistor controlled by an output of the amplifier;

generating an output current through a second output resistor to generate the voltage drop; and generating a bandgap reference voltage at an output terminal of the bandgap circuit, the bandgap reference voltage being the difference between the intermediate output voltage and the error component;

generating an output current through a second output resistor to generate the voltage drop; and generating a bandgap reference voltage at an output terminal of the bandgap circuit, the bandgap reference voltage being the difference between the intermediate output voltage and the error component.

* * * * *